United States Patent [19]

Sugihara et al.

[11] Patent Number: 5,425,118
[45] Date of Patent: Jun. 13, 1995

[54] OPTICAL COMPONENT MOUNTING SUBSTRATE AND METHOD OF PRODUCING THE SAME

[75] Inventors: Miho Sugihara, Higashiosaka; Masaki Aoki, Mino; Makoto Umetani, Izumi; Yoshinari Kashiwagi, Neyagawa; Kenji Inoue, Nishinomiya, all of Japan

[73] Assignee: Matsushita Electric Industrial Co., Ltd., Osaka, Japan

[21] Appl. No.: 174,475

[22] Filed: Dec. 28, 1993

[30] Foreign Application Priority Data

Dec. 28, 1992 [JP] Japan ................................. 4-349097

[51] Int. Cl.⁶ .............................................. G02B 6/30
[52] U.S. Cl. ...................................... 385/51; 385/65; 385/83; 385/59; 65/501
[58] Field of Search ................... 385/51, 52, 59, 65, 385/71, 80, 83, 91, 14, 129, 50; 65/3.11, 386, 501; 359/753; 264/1.5

[56] References Cited

U.S. PATENT DOCUMENTS

| | | | |
|---|---|---|---|
| 4,525,035 | 6/1985 | Nagler | 359/753 X |
| 4,528,148 | 7/1985 | Dotti | 264/1.5 |
| 4,639,074 | 1/1987 | Murphy | 385/49 |
| 4,765,702 | 8/1988 | Dohan et al. | 385/129 |
| 4,789,217 | 12/1988 | Mitch | 385/98 |
| 4,968,109 | 11/1990 | Tanaka | 385/76 |
| 4,973,127 | 11/1990 | Cannon, Jr. et al. | 385/56 |
| 5,061,034 | 10/1991 | Fujikawa et al. | 385/95 |
| 5,234,772 | 8/1993 | Oguchi et al. | 385/14 X |
| 5,297,228 | 3/1994 | Yanagawa et al. | 385/83 X |
| 5,308,555 | 5/1994 | Blyler, Jr. et al. | 264/1.5 |

FOREIGN PATENT DOCUMENTS

| | | | |
|---|---|---|---|
| 0283203 | 9/1988 | European Pat. Off. . | |
| 3428092 | 2/1986 | Germany . | |
| 62-276514 | 12/1987 | Japan | 385/51 |
| 64-26807 | 1/1989 | Japan . | |
| 2-67503 | 3/1990 | Japan | 385/51 |
| 3-27002 | 2/1991 | Japan . | |
| 3-221905 | 9/1991 | Japan . | |
| 3-504649 | 10/1991 | Japan . | |
| 4-296802 | 10/1992 | Japan . | |
| 4-344604 | 12/1992 | Japan . | |
| 4-352109 | 12/1992 | Japan | 385/51 |
| 5-19131 | 1/1993 | Japan | 385/51 |
| 5-134146 | 5/1993 | Japan | 385/51 |
| WO90/04196 | 4/1990 | WIPO . | |

OTHER PUBLICATIONS

European Search Report corresponding to European Patent Application No. 93121032.2 dated Dec. 14, 1994.

*Primary Examiner*—Rodney B. Bovernick
*Assistant Examiner*—Phan Thi Heartney Palmer
*Attorney, Agent, or Firm*—Ratner & Prestia

[57] ABSTRACT

An optical component mounting substrate which comprises grooves for holding optical fibers, other grooves for optical components being inserted and optical waveguides is produced with a press molding process. A mold having convex and/or concave surface profiles which are corresponding to the grooves and the optical waveguides to be formed on a surface of the optical component mounting substrate is used as a die in the press molding process. The surface profiles of the mold are precisely transferred onto the surface of a transparent glass base substrate, thereby forming the optical component mounting substrate having a desired surface configuration including the grooves and the optical waveguides. Optical fibers are aligned along the grooves and fixed by a light-curing adhesive. Since a press molding process is applied, the optical component mounting substrate can be produced easily at a low cost with mass production and also can attain many advantages such as small coupling loss, small crosstalk, high positional accuracy, excellent reproducibility and high reliability.

8 Claims, 5 Drawing Sheets

OPTICAL COMPONENT MOUNTING SUBSTRATE AND METHOD OF PRODUCING THE SAME

BACKGROUND OF THE INVENTION

1. Field of the Invention

The present invention relates to a substrate on which optical components used in optical fiber communication for transmitting high-definition image signals or the like are mounted, and a method of producing the substrate. More particularly, the invention relates to an optical component mounting substrate which is used in an input/output coupler for connecting optical components with an optical fiber that functions as a transmission line.

2. Description of the Related Art

Optical components used in optical fiber communication, such as optical switches, branching filters and polarizing splitters, are usually mounted on a substrate for the purpose of integrating and modularizing components comprising a communication system. Such a substrate is called "an optical component mounting substrate" here.

Figure 8:
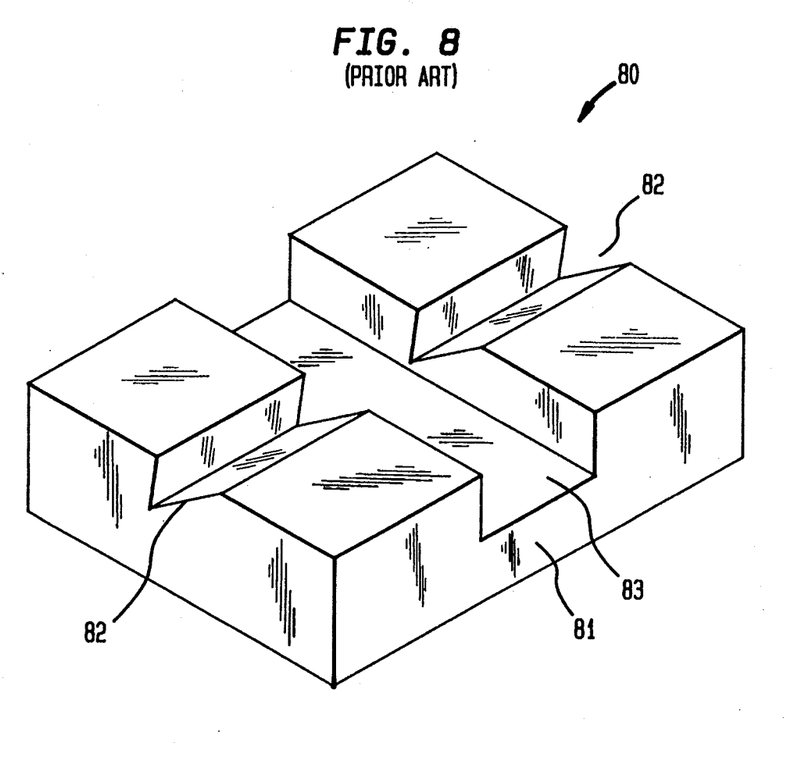
FIG. 8 is a perspective view showing a configuration of an optical component mounting substrate of a prior art.

A typical configuration of an optical component mounting substrate 80 is shown in FIG. 8. On a surface of a base material 81, a V-shaped groove 82 and a four-cornered groove 83 which crosses the V-shaped groove 82 are formed. The V-shaped groove 82 holds an optical fiber (not shown here), called "an optical fiber holding groove" here. The four-cornered groove 83 holds an optical component that will be inserted therein, and be called "an optical component insertion groove" here.

A sheath of an intermediate portion of the optical fiber is removed and a clad in the portion is exposed. This exposed portion is called "a clad-exposed portion". Then the optical fiber is placed linearly along the optical fiber holding groove 82 in such a way that the clad-exposed portion is located in the optical component insertion groove 83. Therefore, the clad-exposed portion of the optical fiber can be optically connected to the optical component inserted and fixed in the groove.

The conventional substrate 80 of the prior art is made of silicon or ceramic. The base material 81 is subjected to manufacturing processes such as etching or dicing saw grinding, and then a precision finishing process is conducted so as to form the V-shaped groove 82 and the four-cornered groove 83 as shown in FIG. 8 (e.g., Japanese Laid-Open Patent Publication Nos. 4-352109 and 5-134146).

In another prior art, a substrate made of plastics is produced by an injection molding method so that grooves can be efficiently formed on its surface (e.g., Japanese Laid-Open Patent Publication No. 5-19131).

From the view point of modularization and integration of optical components for optical fiber communication, it is necessary to assemble optical waveguides and optical components into an optical fiber system.

Most of optical components are optical waveguide devices. The diameter of those waveguides is typically of the order of several microns. On the other hand, optical fibers which are mainly used in optical fiber communication are at present single-mode fibers, which have a core of the order of several microns in diameter and this core functions as an optical transmission line.

Those components and optical fibers must be connected optically to each other to achieve communication. Since the misalignment of cores in an optical coupler causes coupling losses to increase, it is necessary to connect optical waveguides with cores of optical fibers, both of several microns in diameter, with a positional accuracy of 0.5 $\mu$m or less, and with excellent reliability, and moreover, at a low cost.

Sometimes, it is necessary to have a plurality of connections of optical fibers in close proximity to each other. In other cases, V-shaped grooves at input must be formed at different intervals from the output. Furthermore, it is necessary to have optical components and electrical conductors fabricated on the same substrate at the same time.

However, conventional manufacturing methods of optical component mounting substrates of the prior art as mentioned above have many disadvantages.

When a conventional grinding process is conducted for forming grooves on a surface of a substrate, the grooves must be ground one by one. Consequently, it takes a lot of time so production cost increases.

When the number of grooves to be formed is large, a very large number of grinding steps must be conducted. Moreover, it is very difficult to grind different intervals of the grooves side by side.

With the grinding process, intervals of the grooves is limited to a certain level by the operational restriction of the grinding machine used in the process. Therefore, when plural optical fibers are to be connected in close proximity to each other, V-shaped grooves which are to hold the fibers must be ground not in parallel but in a radial manner.

In this case, grinding the grooves in a radial manner with a dicing saw may be conducted instead. That is, however, cumbersome and gives poor fabrication result in which the incident angle of each optical fiber holding groove is not constant. This is because a dicing saw has poor accuracy of rotation angle. Therefore, the coupling loss in that case becomes large.

A photolithograph technique and an etching process can be applied for groove forming. A desired pattern of grooves is formed on a silicon substrate with a photolithograph technique, and then an etching process is conducted with the pattern as a mask in order to form the actual grooves on the substrate surface. However, having grooves of different depth side by side is difficult to create in this manner because of etching characteristics.

In a silicon substrate or a ceramic substrate, it is difficult to integrally form optical waveguides with the grooves in one process. On the contrary, such an integral formation can be conducted with a plastic injection method. Unfortunately, it is difficult to form optical fiber holding grooves and optical waveguides with a positional accuracy of 1 $\mu$m or less in this manner, because plastics have high water absorption and poor heat-resistance, and as a consequence can be easily distorted.

SUMMARY OF THE INVENTION

The optical component mounting substrate of this invention comprises: a glass base substrate; a first groove for holding an optical fiber, the first groove being formed on a surface of the glass base substrate by a press molding process; and a second groove in which an optical component being inserted, the second groove being formed on the surface of the glass base substrate by the press molding process.

In one embodiment, the glass base substrate is made of BK-7 glass.

In another embodiment, the optical component mounting substrate further comprises: a high refractive glass plate having a larger refractive index than that of the glass base substrate, the high refractive glass plate being overlaid on a portion of the surface of the glass base substrate; and a waveguide being formed on a surface of the high refractive glass plate by a press molding process.

In still another embodiment, the high refractive glass plate is made of SF-1 glass.

In still another embodiment, the optical component mounting substrate further comprises electrical conductors on the surface of the glass base substrate.

An optical component mounting apparatus of the invention comprises: a pair of glass substrates, on a surface of each of which a groove for holding an optical fiber is formed by a press molding process, the pair of glass substrates being aligned so that the groove on each surface are opposed to each other; and an optical fiber being fixed in the groove by a light-curing adhesive.

An optical component mounting apparatus of the invention comprises; a glass base substrate; a first groove for holding an optical fiber, the first groove being formed on a surface of the glass base substrate by a press molding process; a second groove in which an optical component being inserted, the second groove being formed on the surface of the glass base substrate by the press molding process; two or more optical waveguides formed on the surface of the glass base substrate by a press molding process; a thin film heating means for heating the optical waveguides; electrical conductors for conveying electric current to the thin film heating means; and an optical fiber being fixed in the first groove by a light-curing adhesive.

In one embodiment, the optical component mounting substrate further comprises a third groove for insulating heat conduction to the optical waveguides from other portions of the glass base substrate.

A method of producing an optical component mounting apparatus by a press molding process of the invention comprises the steps of: providing a glass base substrate; providing a first mold to be used as a die in the press molding process; and conducting a press molding process with the first mold, thereby forming a groove for holding an optical fiber on the surface of the glass base substrate.

In one embodiment, the glass base substrate is made of BK-7 glass.

In another embodiment, the method further comprises the steps of: providing a high refractive glass plate having a larger refractive index than that of the glass base substrate; overlaying the high refractive glass plate on a portion of the surface of the glass base substrate; providing a second mold to be used as a die in the press molding process; and conducting a press molding process with the second mold, thereby forming a waveguide on the surface of the high refractive glass plate.

In still another embodiment, the high refractive glass plate is SF-1 glass.

In still another embodiment, the method further comprises the steps of: aligning an optical fiber in the groove; and fixing the optical fiber by a light-curing adhesive.

In still another embodiment, the method further comprises the steps of: producing another optical component mounting substrate in the same manner; aligning the two optical component mounting substrates so that the groove on each surface are opposed to each other; aligning an optical fiber along the groove between the two optical component mounting substrates; filling a light-curing adhesive into the groove and other spaces between the two optical component mounting substrates; and fixing the light-curing adhesive by light illumination, thus fixing the optical fiber.

In still another embodiment, the first and the second molds are processed in the steps of: providing a base material made of hard metal; and grinding the base material so as to have a desired surface profile for being used as a die in the press molding process.

In still another embodiment, the first and the second molds are processed in the steps of: providing a base material made of hard metal; grinding a surface of the base material so as to have a desired surface profile for being used as a die in the press molding process; and depositing an iridium alloy layer on the surface being ground of the base metal.

In still another embodiment, the first and the second molds are processed in the steps of: providing a base material made of hard metal; depositing a nickel alloy layer on a surface of the base metal; and cutting the surface of the base metal on which the nickel alloy layer is being deposited thereon so as to have a desired surface profile for being used as a die in the press molding process.

In still another embodiment, the first and the second molds are processed in the steps of: providing a base material made of hard metal; depositing a nickel alloy layer on a surface of the base metal; cutting the surface of the base metal on which the nickel alloy layer is being deposited thereon so as to have a desired surface profile for being used as a die in the press molding process; and depositing an iridium alloy layer on the surface being ground of the base metal.

Thus, the invention described herein makes possible the advantages of (1) providing an optical component mounting substrate at a low manufacturing cost with high positional accuracy, and with high reliability which can be miniaturized and integrated, and is therefore suitable for mass production, and (2) providing an optical component mounting apparatus using the above optical component mounting substrate.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of examples.

EXAMPLE 1

Figure 1:
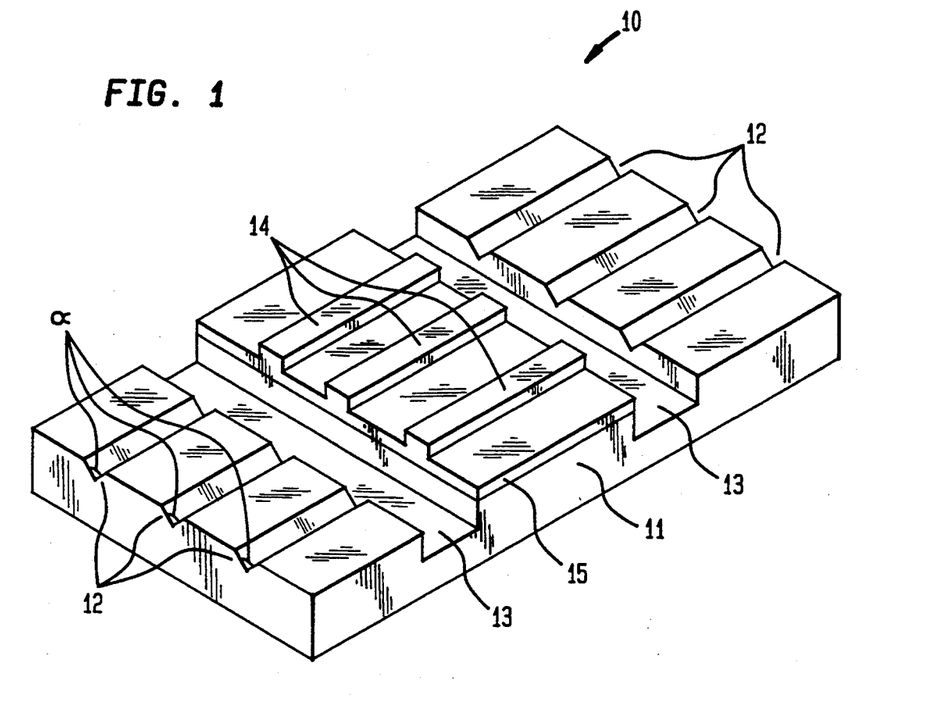
FIG. 1 is a perspective view showing a configuration of an optical component mounting substrate in an embodiment of the invention.

FIG. 1 is a perspective view showing a configuration of an optical component mounting substrate 10 in an embodiment of this invention. In this embodiment, V-shaped optical fiber holding grooves 12 which hold optical fibers, optical component insertion grooves 13 in which optical components are inserted and optical waveguides 14 are formed on a surface of a glass base substrate 11 made of glass.

Then, referring to FIGS. 2, 3 and 4, a method of producing the optical component mounting substrate 10 will be described.

Figure 2:
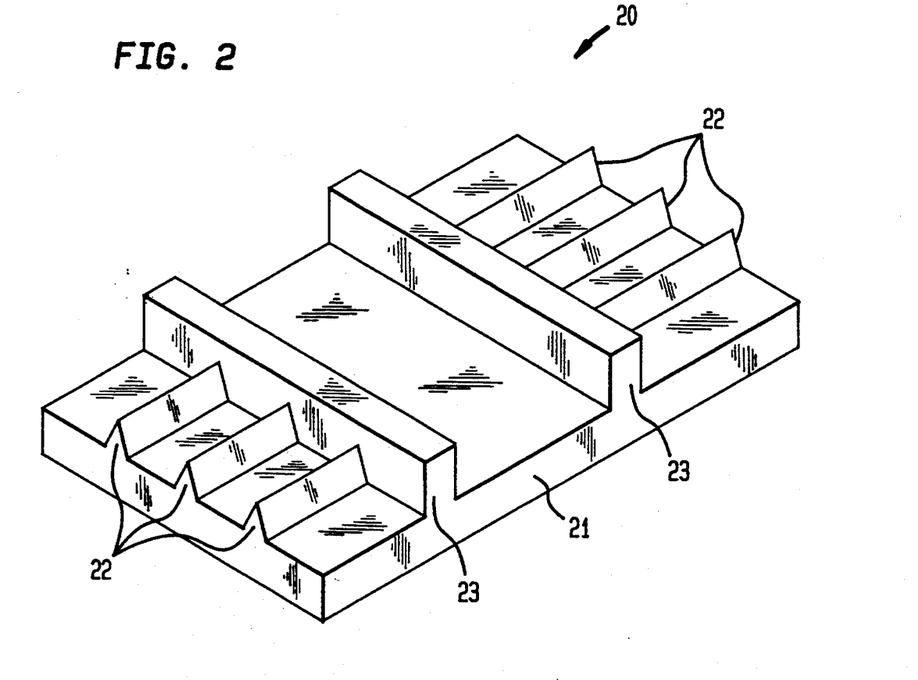
FIG. 2 is a perspective view of a mold to be used for producing optical fiber holding grooves and optical component insertion grooves of the optical component mounting substrate shown in FIG. 1.

FIG. 2 shows a mold 20 to be used for forming the optical fiber holding grooves 12 and the optical component insertion grooves 13.

A block of sintered hard metal to be a base material 21 is ground so as to have a convex surface profile 22 with a pitch accuracy of ±0.5 μm. This convex surface profile 22 functions as a die in a press molding process for forming the V-shaped optical fiber holding grooves 12 (having an apex angle α of 70 deg. and a depth of 80 μm). Then, another convex profile 23 to function as a die for forming the optical component insertion grooves 13 is ground so as to have a geometric accuracy of ±0.5 μm (of a width of 500 μm).

The surface of hard metal is likely to be reacted with a glass surface in a press molding process. Therefore, the processed face is then coated with an iridium (Ir) alloy layer which is less reactive with the glass surface (such as Ir-rhenium alloy, Ir-platinum alloy, Ir-rhodium alloy or Ir-tantalum alloy) of a thickness of 1.5 μm, thereby constructing the mold 20 for forming the optical fiber holding grooves 12 and the optical component insertion grooves 13 on the glass base substrate 11 as shown in FIG. 1. The coating process is typically conducted by sputtering, but is not limited to that method. This iridium alloy layer is not shown in FIG. 2.

Then, BK-7 glass substrate (with a refractive index of n=1.516) is provided as the glass base substrate 11 and is placed between the mold 20 and another flat mold (not shown here). A press molding process is conducted for 3 minutes at a temperature of 590° C. and at a pressure of 40 kg/cm² in nitrogen atmosphere. A preferable range of temperature for this press molding process is 550° to 630° C. and a preferable range of pressure for this press molding process is 20 to 80 kg/cm².

Figure 3:
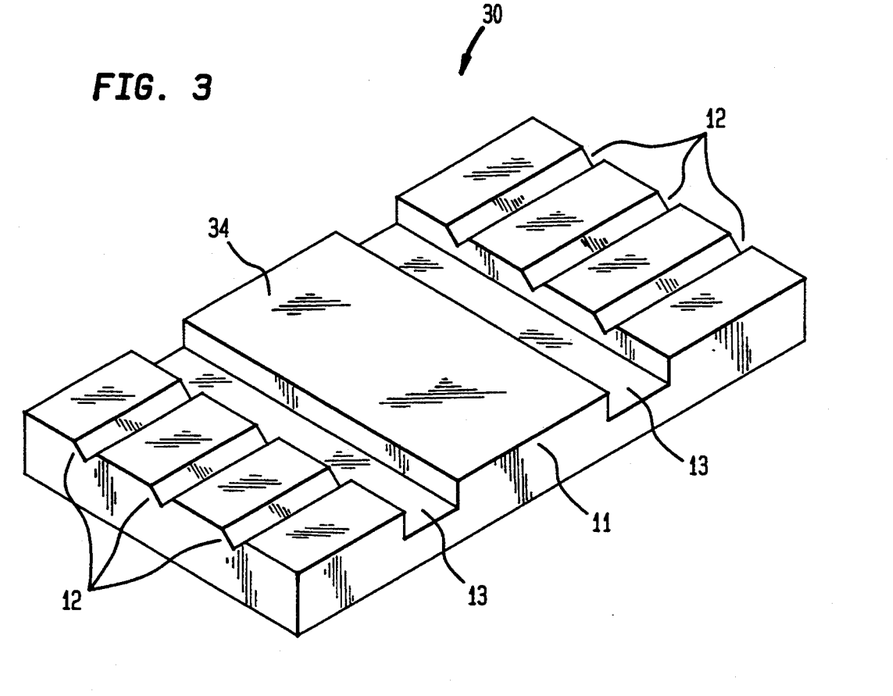
FIG. 3 is a perspective view of a glass substrate after the optical fiber holding grooves and the optical component insertion grooves have been formed with the mold shown in FIG. 2.

The result of the press molding process is shown in FIG. 3. The V-shaped optical fiber holding grooves 12 and the optical component insertion grooves 13 are formed on a surface of the glass base substrate 11.

There still remains a flat portion 34 on the surface of the glass base substrate 11. The optical waveguides 14 as shown in FIG. 1 will be formed thereon in the next step.

Figure 4:
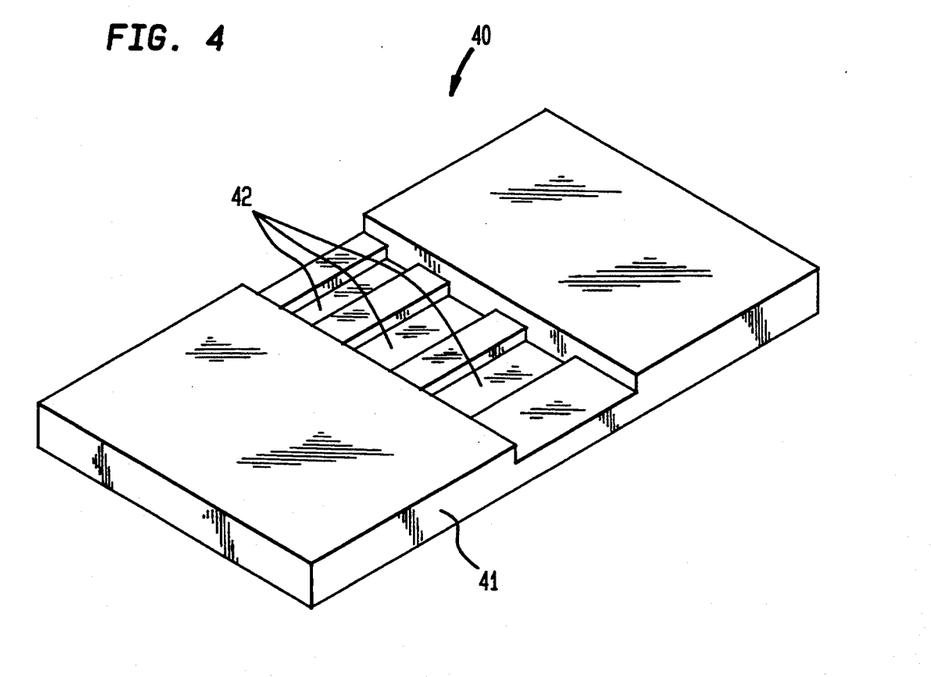
FIG. 4 is a perspective view of another mold to be used for producing optical waveguides of the optical component mounting substrate shown in FIG. 1.

FIG. 4 shows another mold 40 to be used for forming the optical waveguides 14. In order to fabricate this mold 40, another block of sintered hard metal is provided. A surface of the block is ground so as to have a concave profile 42 (having a groove depth of 7 μm and a width of 7 μm) with a pitch accuracy of ±0.5 μm. This concave profile 42 functions as a die in a press molding process for forming the optical waveguides 14 on the flat portion 34 of the surface of the glass base substrate 11 shown in FIG. 3.

Thereafter, the processed face is coated in the same manner and from the same reason as described before with an iridium (Ir) alloy layer (such as Ir-rhenium alloy, Ir-platinum alloy, Ir-rhodium alloy or Ir-tantalum alloy) of a thickness of 1.5 μm, thereby constructing another mold 40 for forming the optical waveguides 14. The iridium alloy layer is not shown in FIG. 4.

Then, a glass plate 15 made of SF-1, a refractive index of which (n=1.717) is larger than that of BK-7 (n=1.516), is overlaid on the flat portion 34 of the glass base substrate 11 as shown in FIG. 1. With the mold 40 and another flat mold (not shown here), a press molding process is conducted in a similar manner as described before for 3 minutes at a temperature of 460° C. and at a pressure of 10 kg/cm² in nitrogen atmosphere. A preferable range of temperature for this press molding process is 430° to 490° C. and a preferable range of pressure for this press molding process is 5 to 40 kg/cm².

As a result, the concave profile 42 is transferred onto a surface of the SF-1 plate 15 and therefore, the optical waveguides 14 are formed on the surface. At the same time, the glass base substrate 11 of BK-1 and the glass plate 15 of SF-1 are directly bonded with physical bonding at their interface, thereby completing the optical component mounting substrate 10 shown in FIG. 1.

Some measured results of geometric accuracy of the optical component mounting substrate 10 in the first embodiment of this invention described above are shown in Table 1, column No. 1. The result of the reliability test is also listed in the same column.

This table shows that a desired surface configuration of the optical component mounting substrate 10 can be fabricated with high mechanical accuracy. In addition, no distortion is observed after the reliability test.

TABLE 1

| Sample No. | No. 1 | No. 2 |
| --- | --- | --- |
| Pitch accuracy of optical fiber holding grooves | ±0.5 μm | ±0.3 μm |
| Shape accuracy of optical component insertion grooves | ±0.5 μm | ±0.3 μm |
| Pitch accuracy of optical waveguides | ±0.5 μm | ±0.3 μm |
| Change of accuracy of each part after reliability test (150° C., 1000 hours) | none | none |

EXAMPLE 2

Another embodiment of the invention will be described hereafter. The appearance of this second embodiment is substantially similar to the first embodiment described above. Therefore, the same FIGS. 1 to 4 are referred to again.

Cutting with a diamond tool is generally able to bring better manufacturing accuracy and more minute pitch than the grinding process described before. However, the hard metal that is used as the molds in the above-mentioned first embodiment is too hard to be cut with the diamond tool. The diamond tool would be severely abraded in such a process.

In order to avoid this problem and achieve better manufacturing accuracy, the surfaces of the molds are coated with a nickel alloy layer in the second embodiment of this invention that will be describes hereafter.

Similar to that described before in FIG. 2, a block of sintered hard metal is provided as a base material 21 in order to produce a mold 20. In this case, however, a nickel (Ni) alloy layer (such as Ni-steel, Ni-phosphorus, Ni-boron or Ni-molybdenum) is deposited with a thickness of 100 μm on a surface of the block. Typically, this is done by a sputtering method.

Then, the coated surface of the block is cut by a diamond cutting tool so as to form a convex surface profile 22 with a pitch accuracy of ±0.3 μm. This profile is later used as a die for forming optical fiber holding grooves 12 in a press molding process, similarly as in the case of the first embodiment. Another convex profile 23 for forming optical component insertion grooves 13 is also cut so as to have a geometric accuracy of ±0.3 μm (of a width of 500 μm).

Thereafter, the processed face is coated with an iridium (Ir) alloy layer (such as Ir-rhenium alloy, Ir-platinum alloy, Ir-rhodium alloy or Ir-tantalum alloy) in the same way and from the same reason as in the first embodiment, thereby constructing the mold 20 for forming the optical fiber holding grooves 12 and the optical component insertion grooves 13 on the surface of the glass base substrate 11.

Then, another block of sintered hard metal is provided, which is to be a base material 41 of another mold 40 as shown in FIG. 4. A nickel (Ni) alloy layer (such as Ni-steel, Ni-phosphorus, Ni-boron or Ni-molybdenum) is deposited with a thickness of 100 μm on a surface of the block. Typically, this is done by a sputtering method.

Then, the coated surface of the block is cut with a diamond cutting tool so as to form a concave profile 42 (having a groove depth of 7 μm and a width of 7 μm) with a pitch accuracy of ±0.3 μm. This concave 42 profile functions as a die in a press molding process for forming optical waveguides 14 on the surface of the glass base substrate 11.

Thereafter, the processed surface is coated in the same manner and from the same reason as described before with an iridium (Ir) alloy layer (such as Ir-rhenium alloy, Ir-platinum alloy, Ir-rhodium alloy or Ir-tantalum alloy) of a thickness of 1.5 μm, thereby constructing another mold 40 for forming the optical waveguides 14 of the optical component mounting substrate 10.

The nickel alloy layer and the iridium alloy layer on the molds 20 and 40 are not shown in FIGS. 2 and 4.

The subsequent press molding processes are conducted in the same manner as those of the first embodiment described before so as to form the optical fiber holding grooves 12, the optical component insertion grooves 13 and the optical waveguides 14, thereby constructing the optical component mounting substrate 10.

Some measured results of geometric accuracy of the optical component mounting substrate 10 in the second embodiment of this invention are also shown in Table 1, Column No. 2. The result of the reliability test is also listed in the same column.

As shown in Table 1, the optical component mounting substrate produced by cutting with a diamond tool in column No. 2 shows minuter geometric accuracy than that in column No. 1 produced by grinding.

EXAMPLE 3

Figure 5:
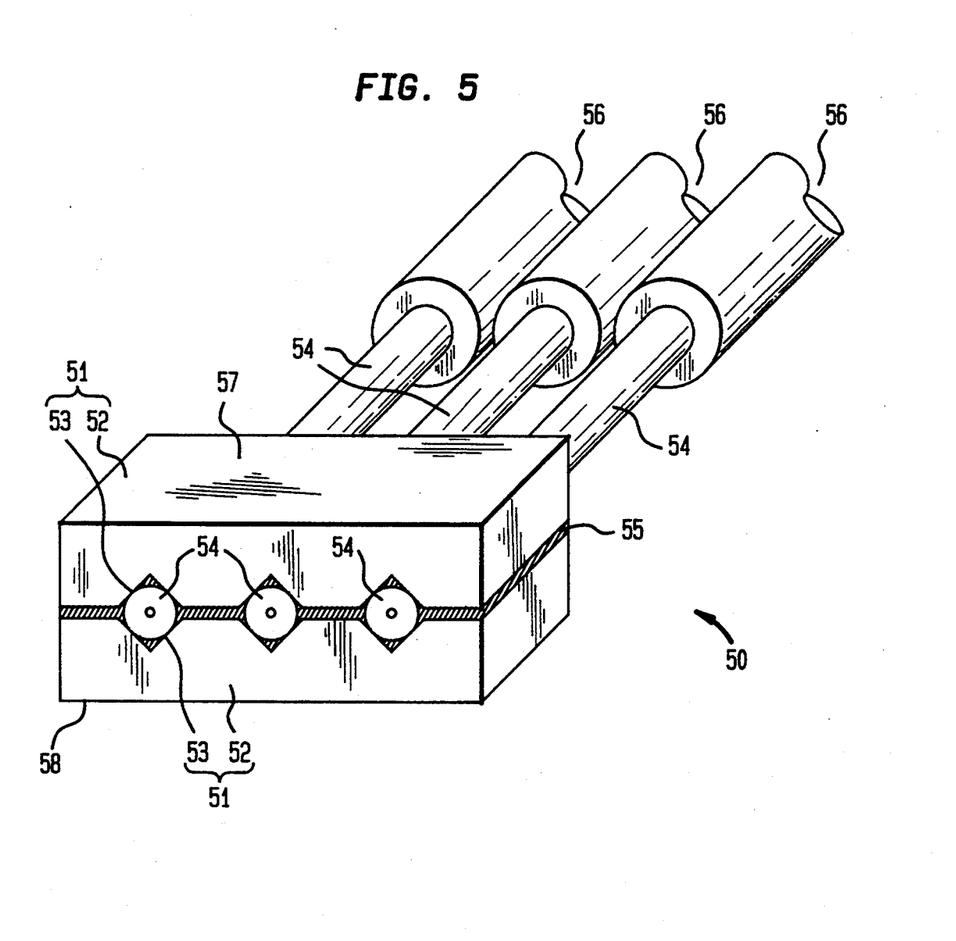
FIG. 5 is a perspective view showing a configuration of an optical component mounting substrate functioning as an optical fiber array in another embodiment of this invention.

Referring to FIG. 5, as the third embodiment of the invention, an optical fiber array 50 which has a pair of optical component mounting substrates 51 produced in accordance with the invention is described.

On a surface of a glass base substrate 52 of each of the pair of optical component mounting substrates 51, V-shaped grooves 53 are formed by a press molding process. This process is conducted in the same manner as described before for the first and the second embodiment.

The pair of optical component mounting substrates 51 are aligned so that the grooves 53 formed on their surfaces are opposed to each other. Clad-exposed portions 54 of optical fibers 56 are deposited along each of the grooves 53. Then, a photo-curing adhesive 55 is filled into the grooves 53 and other space between the aligned pair of optical component mounting substrates 51. Light is illuminated so that the adhesive 55 and the clad-exposed portions 54 of the optical fibers 56 are fixed, thereby constructing the optical fiber array 50.

The depth of the grooves 53 can be adequately determined according to the diameter of the clad-exposed portions 54 of the optical fibers 56 to be fixed. Typically, it is 10 to 200 μm.

Next, some advantages of the thus configurated optical fiber array 50 will be described.

The optical component mounting substrates 51 in the optical fiber array 50 are produced by a press molding process. In the process, as described for the first and the second embodiments of the invention above, convex and concave profiles of molds are precisely transferred onto a transparent glass base material 52 so that the grooves 53 are precisely formed.

In addition, a large number of the substrates can be produced easily. Optical components on each surface are located precisely at the designed position. This means that in this manner, mass production of the optical component mounting substrates can be conducted at a low cost with high positional accuracy.

On the other hand, the photo-curing adhesive 55 is used to fix the optical fibers 56. Therefore, light must be illuminated onto the adhesive 55. Since the optical component mounting substrates 51 of this embodiment are made of transparent glass, light can reach to the adhesive 55 through the substrates 51 both from a front surface 57 and from a back surface 58 of the substrates 51. This makes the fixation process substantially easier.

Before the light illumination causes the adhesive 55 to fix, the clad-exposed portions 54 of the optical fibers 56 are sandwiched between the pair of the substrates 51 and the temporarily but rather firmly fixed. This brings less positional deviation of the fixed fibers 56.

Moreover, the substrates 51 generally exhibit excellent bonding strength with many kinds of photocuring adhesive that can be used. Therefore, the optical fibers 56 in the grooves 53 can be fixed more firmly with less positional deviation and without distortion.

Another advantage of the optical fiber array 50 of this embodiment is that the fixation process can be visually checked anytime, since the substrates 51 are transparent.

Although not shown in the figure, the optical fiber array 50 can also be coupled with another optical component in the same manner.

EXAMPLE 4

Figure 6:
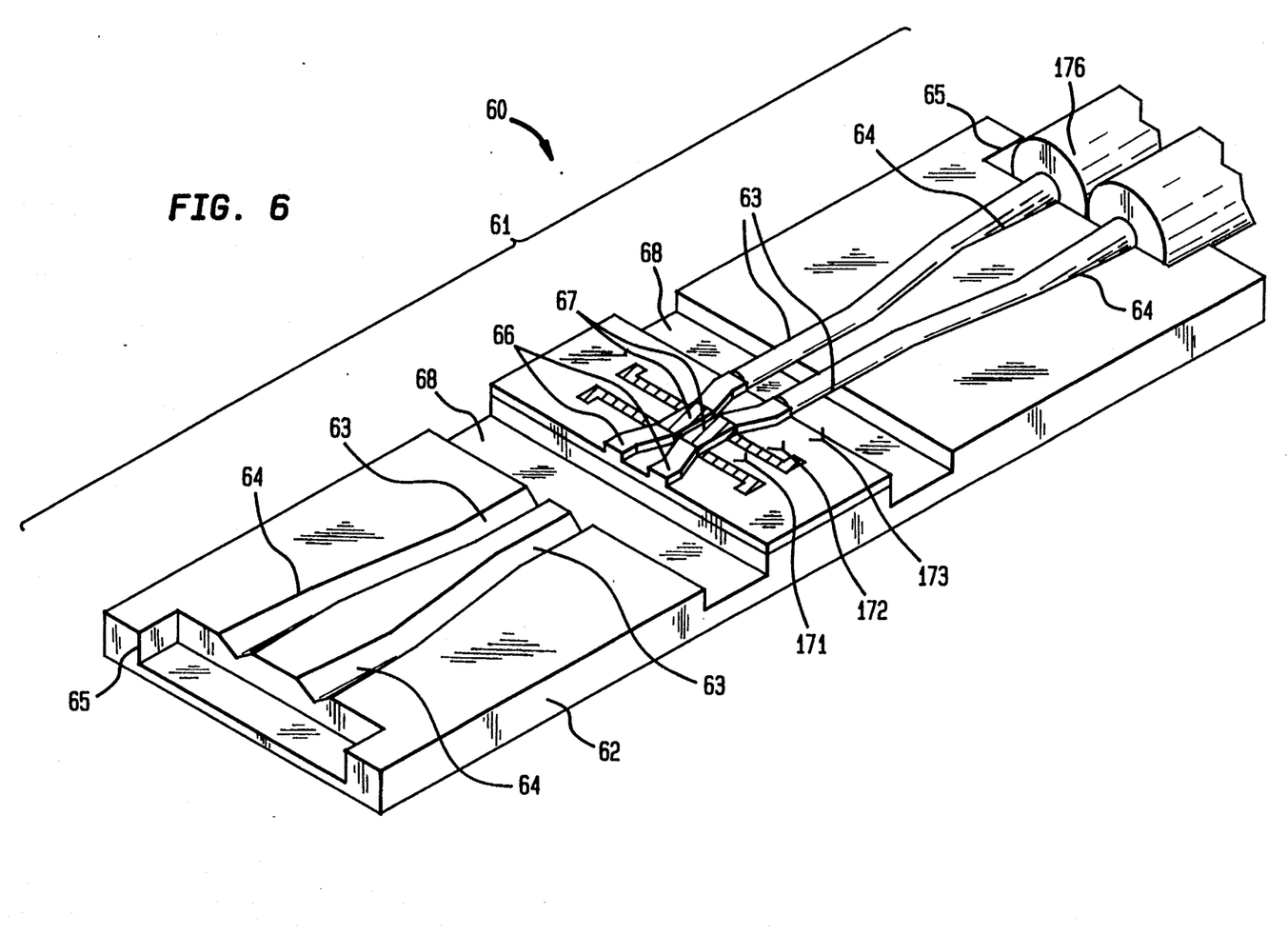
FIG. 6 is a perspective view showing a configuration of an optical component mounting substrate functioning as an optical switch in still another embodiment of this invention.

Referring to FIG. 6, an optical switch 60 which has an optical component mounting substrate 61 produced in accordance with the invention is described as the fourth embodiment of the invention. On a surface of a glass base substrate 62, grooves 63, 64 and 65 are formed for holding optical fibers 176, optical waveguides 66 between which light energy is transferred and grooves 68 for insulating heat conduction to the optical waveguides 66 from other portions of the glass base substrate 62.

Although not shown in FIG. 6, the optical fibers 176 are disposed in the grooves 63, 64 and 65 not only on the right part of the glass base substrate 62 but also on the left part in the same manner.

The optical component mounting substrate 61 further comprises thin film heating means 67 for heating the optical waveguides 66. The heating means 67 is preferably a titanium resistance film.

Electrical conductors (not shown in the figure) are also formed on a side face and the back face of the glass base substrate 62 in the following manner: Coper is plated on the side and the back faces of the glass base substrate 62, a photoesist is overlaid on the plated copper, and a conductor pattern is formed by a photolithography technique so that the resist pattern corresponding to a electrical conductor pattern remains on the surface. Then, unnecessary portions of copper are removed by etching, and the resist washed away, thereby forming the electrical conductors on the surface of the glass base substrate 62.

Next, the function of the optical switch 60 will be described.

The optical waveguides 66 with the same propagation constant are formed in parallel and in close proximity to each other. Intervals and length of the optical waveguides 66 in the proximate area 171 are optimized so that light energy can be transferred with 100% efficiency from one waveguides to another when light travels a distance of an odd-number multiple of the perfect coupling length. For the light of a wavelength of 1.3 $\mu$m, a preferably interval of the optical waveguides 66 in the proximate area 171 is 3 $\mu$m and a preferably length of the proximate area 171 is 0.7 $\mu$m. The optical waveguides themselves in this case are preferably 8 $\mu$m wide and 10 $\mu$m high.

When DC voltage is applied to the thin film heating means 67, a current flows along the heating means 67 to generate Joule heat. This heat causes the temperature to increase in the vicinity of the optical waveguides 66, and introduces a temperature gradient there. This temperature increase causes the refractive index of the optical waveguides 66 to change through a thermo-optic effect.

When the current flow of the electrical conductors is changed, the amount of the power consumption at the thin film heating means 67 changes, which further causes a propagation constant of the optical waveguides 66 to change. Consequently, a phase difference which governs transfer of light energy between the optical waveguides 66 can be controlled. As for the results, the optical coupling between the optical waveguides 66 is alternatively produced or cancelled by controlling and adjusting the current flow of the electrical conductors, thereby the optical switching function is achieved.

Since the optical switch 60 of this embodiment utilizes the thermo-optical effect, it is preferable to reduce heat capacity in the vicinity of the optical waveguides 66 to be as low as possible, in order to attain quick responses. This is the reason why the grooves 68 are formed so as to insulate heat conduction to the optical waveguides 66 from other portions of the glass base substrate 62.

Preferably, the optical waveguides 66 in the proximate area 171 must be located to be as close as possible in order to achieve effective transfer of light energy. On the contrary, in an interface area 173 between the optical waveguides 66 and the optical fibers 176, the optical waveguides 66 must be separated from each other by some intervals in order to avoid crosstalk. However, when the intervals in the interface area 173 are too large, the optical waveguides 66 are forced to curve at large angle between the interface area 173 and the proximate area 171 (area 172 in FIG. 6 refers). This results in a large radiation mode loss.

Figure 7A:
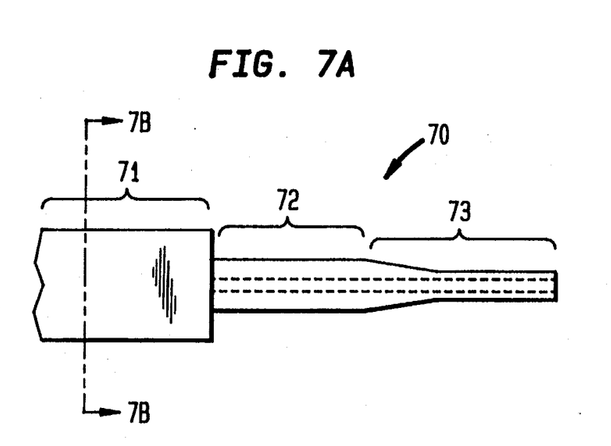
FIG. 7A is a side view of a single-mode optical fiber used in the embodiment of this invention shown in FIG. 6.
Figure 7B:
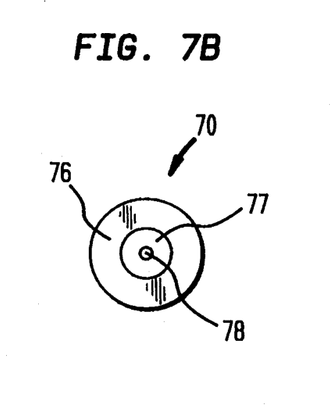
FIG. 7B is a cross-section of the same optical fiber along the line 7B—7B indicated in FIG. 7A.

To avoid this disadvantage, an optical fiber 70 shown in FIGS. 7A and 7B may preferably be used in the embodiment. This is a single-mode optical fiber, a side view of which is shown in FIG. 7A and a cross-section of which along the line 7B—7B in FIG. 7A is shown in FIG. 7B. As shown in FIG. 7B, the optical fiber 70 comprises a jacket 76, a clad 77 with diameter of 125 $\mu$m and a core 7B with diameter of 9 $\mu$m.

One end of the optical fiber 70 is processed so as to form a clad-exposed portion 72 in which the jacket 76 is removed to expose the clad 77. Furthermore, the outer diameter of the clad 77 is reduced in some portion (called "a clad-reduced portion" 73 here), as shown in FIG. 7A, by any process such as etching with hydrofluoric acid.

On the other hand, the jacket 76 still remains on other part of the fiber 70, which is called a jacket-covered portion 71.

As shown in FIG. 6, grooves 63, 64 and 65 for holding the clad-reduced portion 73, the clad-exposed portion 72 and the jacket-covered portion 71 of the optical fibers 70, respectively, are formed on the surface of the glass base substrate 61 with a press molding process. The intervals of the grooves 63 and 64 may be different between the portion referred to as 63 and the portion referred to as 64. Such a configuration can be easily produced simply by transferring convex and concave surface profiles of molds, formed in a desired pattern, onto the surface of the glass base substrate by a press molding process.

The depth of the grooves 63, 64 can be adequately determined in accordance with the diameter of the optical fiber 176 to be fixed. Typically, the grooves 63 are 10 to 100 $\mu$m in deep, and the grooves 64 are 30 to 200 $\mu$m deep.

As apparent from the above description, in accordance with the invention, grooves for holding optical fibers, grooves into which optical components are to be inserted, and optical waveguides are formed on a glass substrate with a press molding process, thereby constructing an optical component mounting substrate. Even when the grooves have to have different intervals, or the optical fibers have to be aligned in close proximity to each other in a coupling area, the optical component mounting substrate of this invention can be produced easily at a low cost by mass production. The substrate can also attain many advantages such as small coupling loss, small crosstalk, high positional accuracy, excellent reproducibility, high reliability and small manufacturing cost.

Furthermore, the invention provides an excellent optical component mounting substrate on which electrical conductors and other components for operating the optical components can be formed. Therefore, the invention is very beneficial for the industry.

In the embodiments described above, the optical fiber holding grooves are V-shaped. However, their cross-sectional shape is not limited to this shape, and other cross-sectional shape such as a U-shape or four-cornered may be used instead. Cross-sectional shapes of other grooves in the embodiments described above are also not limited to what are described here.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly constructed.

What is claimed is:

1. An optical component mounting substrate comprising:
   a glass base substrate having a refractive index;
   said substrate including a first portion having a first groove for holding an optical fiber, the first groove being formed on a surface of the glass base substrate by a first press molding process;
   said substrate including a second portion having a second groove in which an optical component is inserted, the second groove being formed on the surface of the glass base substrate by the first press molding process;
   said substrate including a third portion separate and distinct from said first and second portions;
   a glass plate overlaid and directly and physically bonded to said third portion by a second press molding process, said glass plate having a refractive index that is larger than the refractive index of the glass base substrate; and
   a waveguide formed on a surface of said glass plate by the second press molding process.

2. An optical component mounting substrate according to claim 1, wherein the glass base substrate is made of BK-7 glass.

3. An optical component mounting substrate according to claim 1, further comprising electrical conductors on the surface of the glass base substrate.

4. An optical component mounting substrate according to claim 1, wherein the glass plate is made of SF-1 glass.

5. An optical component mounting substrate according to claim 1, wherein the first press molding process is conducted in nitrogen atmosphere at a temperature range between 550° and 630° C. and at a pressure range between 20 to 80 kg/cm$^2$, and the second press molding process is conducted in nitrogen atmosphere at a temperature range between 430° and 490° C. and at a pressure range between 5 to 40 kg/cm$^2$.

6. An optical component mounting substrate according to claim 1, wherein the waveguide has a convex cross-sectional shape.

7. An optical component mounting apparatus comprising:
   a glass base substrate;
   a first groove for holding an optical fiber, the first groove being formed on a surface of the glass base substrate by a press molding process;
   a second groove in which an optical component being inserted, the second groove being formed on the surface of the glass base substrate by the press molding process;
   two or more optical waveguides formed on the surface of the glass base substrate by a press molding process;
   a thin film heating means for heating the optical waveguides;
   electrical conductors for conveying electric current to the thin film heating means; and
   an optical fiber being fixed in the first groove by a light-curing adhesive.

8. An optical component mounting substrate according to claim 7, further comprising a third groove for insulating heat conduction to the optical waveguides from other portions of the glass base substrate.

* * * * *

UNITED STATES PATENT AND TRADEMARK OFFICE
CERTIFICATE OF CORRECTION

PATENT NO.   : 5,425,118
DATED        : June 13, 1995
INVENTOR(S)  : Sugihara et al.

It is certified that error appears in the above-identified patent and that said Letters Patent is hereby corrected as shown below:

Column 9, line 30, delete "Coper" and insert therefor --Copper--.

Column 9, line 32, delete "photoesist" and insert therefor --photoresist--.

Column 10, line 33, delete "7B" and insert therefor --78--.

Signed and Sealed this

Twelfth Day of September, 1995

BRUCE LEHMAN

*Attest:*

*Attesting Officer*      *Commissioner of Patents and Trademarks*